United States Patent
Isberg et al.

(10) Patent No.: US 11,076,015 B2
(45) Date of Patent: Jul. 27, 2021

(54) PROXY DEVICES AND METHOD FOR SERVING SLEEPY INTERNET-OF-THINGS DEVICES

(71) Applicant: Sony Mobile Communications Inc., Tokyo (JP)

(72) Inventors: Andrew Isberg, Lund (SE); Claes Nilsson, Lund (SE); Mattias Falk, Lund (SE); Anders Edenbrandt, Lund (SE)

(73) Assignee: Sony Group Corporation, Tokyo (JP)

( * ) Notice: Subject to any disclaimer, the term of this patent is extended or adjusted under 35 U.S.C. 154(b) by 381 days.

(21) Appl. No.: 16/088,324

(22) PCT Filed: Apr. 4, 2016

(86) PCT No.: PCT/US2016/025861
§ 371 (c)(1),
(2) Date: Sep. 25, 2018

(87) PCT Pub. No.: WO2017/176241
PCT Pub. Date: Oct. 12, 2017

(65) Prior Publication Data
US 2020/0304589 A1  Sep. 24, 2020

(51) Int. Cl.
*G06F 13/00* (2006.01)
*H04L 29/08* (2006.01)
(Continued)

(52) U.S. Cl.
CPC .......... *H04L 67/2842* (2013.01); *H04L 67/12* (2013.01); *H04L 67/145* (2013.01);
(Continued)

(58) Field of Classification Search
CPC ... H04L 67/2842; H04L 67/12; H04L 67/145; H04L 67/289; H04W 52/0209;
(Continued)

(56) References Cited

U.S. PATENT DOCUMENTS 9,077,630 B2 *  7/2015  Backholm .............. H04L 47/20
10,070,407 B2 *  9/2018  Chastain .............. H04W 60/00
(Continued)

FOREIGN PATENT DOCUMENTS

GB          2516511        1/2015
WO        2015006636       1/2015

OTHER PUBLICATIONS

Werstein et al. "A Low-Power Proxy to Allow Unattended Jabber Clients to Sleep", Parallel and Distributed Computing, Applications and Technologies, 2008, PDCAT 2008, Ninth International Conference on, IEEE, Piscataway, NJ, USA, Dec. 1, 2008, (Dec. 1, 2008), pp. 390-395, XP031373730, ISBN: 978-0-7695-3443-3.
(Continued)

*Primary Examiner* — Kenneth R Coulter
(74) *Attorney, Agent, or Firm* — Myers Bigel, P.A

(57) ABSTRACT

A proxy device includes a processor circuit, a memory coupled to the processor circuit, and a network interface coupled to the processor circuit. The processor circuit is configured to function as a proxy for network communications to and from an internet of things, IoT, device that is located within a same home network as the proxy device. The processor circuit is configured to determine that the IoT device is in sleep mode in which the IoT device is unable to send or receive network communications, and, in response to determining that the IoT device is in sleep mode, to store network communications received from a remote server on behalf of the IoT device until determining that the IoT device has entered active mode in which the IoT device is able to send and receive network communications.

19 Claims, 7 Drawing Sheets

(51) Int. Cl.
*H04W 52/02* (2009.01)
*H04W 88/18* (2009.01)
(52) U.S. Cl.
CPC ....... *H04L 67/289* (2013.01); *H04W 52/0209* (2013.01); *H04W 88/182* (2013.01)
(58) Field of Classification Search
CPC ........... H04W 88/182; H04W 52/0251; H04W 52/0229; H04W 52/0216
USPC ................ 709/237, 230, 203, 224, 232, 234
See application file for complete search history.

(56) References Cited

U.S. PATENT DOCUMENTS

| | | | | |
|---|---|---|---|---|
| 10,212,654 | B2* | 2/2019 | Seed | H04W 52/0216 |
| 10,375,663 | B2* | 8/2019 | Chastain | H04W 8/04 |
| 10,404,601 | B2* | 9/2019 | Seed | H04L 67/125 |
| 10,887,821 | B2* | 1/2021 | Nenner | H04L 29/08 |
| 2008/0070614 | A1 | 3/2008 | Ogushi | |
| 2012/0023236 | A1* | 1/2012 | Backholm | H04W 28/14 |
| | | | | 709/226 |
| 2013/0089015 | A1 | 4/2013 | Choong | |
| 2016/0174148 | A1* | 6/2016 | Seed | H04W 40/005 |
| | | | | 370/311 |
| 2018/0160358 | A1* | 6/2018 | Nenner | H04L 67/04 |
| 2018/0160385 | A1* | 6/2018 | Chastain | H04W 8/04 |
| 2018/0324736 | A1* | 11/2018 | Chastain | H04W 8/04 |
| 2019/0036825 | A1* | 1/2019 | Seed | H04L 67/1031 |

OTHER PUBLICATIONS

Office Action dated Dec. 5, 2019 in corresponding European Application No. 16 716 151.2 (5 pages).
Chinese Office Action corresponding to CN 201680084125.4; dated Sep. 29, 2020 (18 pages, including English Translation).
PCT International Preliminary Report on Patentability, corresponding to PCT International Application No. PCT/US2016/025861, dated Oct. 9, 2016 (11 pages).
European Patent Office Communication dated Jul. 17, 2019 for corresponding EP Application No. 16 716 151.2.7 (7 pages).
PCT International Search Report, corresponding to PCT International Application No. PCT/US2016/025861, dated Oct. 17, 2016 (4 pages).
PCT Written Opinion, corresponding to PCT International Application No. PCT/US2016/025861, dated Oct. 17, 2016 (9 pages).

* cited by examiner

PROXY DEVICES AND METHOD FOR SERVING SLEEPY INTERNET-OF-THINGS DEVICES

CROSS-REFERENCE TO RELATED APPLICATIONS

The present application is a 35 U.S.C. § 371 national phase application of PCT Application Serial No. PCT/US2016/025861, filed Apr. 4, 2016, the disclosure of which is hereby incorporated herein in its entirety by reference.

FIELD

The present inventive concepts relate to managing connectivity of devices in communications networks, and in particular to managing connectivity in communications networks of devices configured for machine-type communications in the Internet of Things.

BACKGROUND

The Internet of Things (IoT) refers to network of devices that are equipped with electronics and software that allow them to communicate with one another over the Internet. Communication between such devices is sometimes referred to as "machine type communications." That is, the field of communications has generally focused on the development of technologies that facilitate communication between human beings, or between devices that are operated or controlled by human beings. As such, these communication technologies employ transmission media, transmission equipment, transmission protocols, and even billing and management structures that are designed to efficiently and profitably carry human-centric communication traffic.

Machine Type Communications (MTC), or Machine-to-Machine (M2M) communications, refers to communication between machines with no, or only limited, human involvement. Typically, MTC is used to collect data from remotely deployed "smart" devices (i.e., devices that form a part of the Internet of Things). The collected data can be processed at a centralized location that may be far away from the devices that collected the data. MTC thus has a number of important applications, such as remote monitoring, remote metering, asset tracking, automation, toll collection, emission management, and many others.

Using MTC, the Internet of Things allows devices to be controlled remotely across existing network infrastructure. This allows many different types of devices to be more directly integrated into computer-based systems, with numerous attendant benefits. For example, the Internet of Things enables the construction and operation of technologies, such as smart grids, smart homes, intelligent transportation and smart cities. It is estimated that the IoT will consist of almost 50 billion objects by 2020.

Many IoT devices will be hosted behind a Network Address Translator (NAT) and/or a firewall, such as on a local area network (LAN), a small sensor network, a corporate intranet or a mobile network (referred to herein as a "home network" of an IoT device). For that reason, many IoT devices will not be addressable from a server located outside the home network in which the device is located. For IPv4 networks, this is a natural limitation due to the lack of available IPv4 addresses; IPv6 networks do not have this limitation. However it is anticipated that the majority of IPv6 networks will continue to have some type of firewall to protect resources in the network. Thus, although it will be technically possible for devices in an IPv6 network to be addressed from outside the home network, a firewall will typically block such traffic.

SUMMARY

A proxy device according to some embodiments includes a processor circuit, a memory coupled to the processor circuit, and a network interface coupled to the processor circuit. The processor circuit is configured to function as a proxy for network communications to and from an internet of things, IoT, device that is located within a same home network as the proxy device. The processor circuit is configured to determine that the IoT device is in sleep mode in which the IoT device is unable to send or receive network communications, and, in response to determining that the IoT device is in sleep mode, to store network communications received from a remote server on behalf of the IoT device until determining that the IoT device has entered active mode in which the IoT device is able to send and receive network communications. The processor circuit is further configured to send the stored network communications to the IoT device in response to determining that the IoT device has entered active mode.

The processor circuit may be configured to send keep-alive messages to the remote server while the IoT device is in sleep mode.

The processor circuit may be configured to determine whether the IoT device is in sleep mode based on a sleep mode schedule provided by the IoT device to the proxy device.

The processor circuit may be configured to determine whether the IoT device is in sleep mode in response to detecting signaling from the IoT device over a low power radio protocol.

The processor circuit may be configured to determine that the IoT device is no longer in sleep mode in response to receiving an explicit control message from the IoT device.

The processor circuit may be configured to determine that the IoT device is no longer in sleep mode in response to receiving a network communication from the IoT device.

The processor circuit may be configured to implement transmission control protocol, TCP, and lower level protocols, and to pass higher level protocol communications through to the IoT device without change.

The higher level protocol communications may include transport layer security, TLS, protocols.

The higher level protocol communications may include hypertext transport protocol, HTTP, protocols.

A method according to some embodiments includes determining, at a proxy device coupled to a home network, that an Internet of Things, IoT, device in the home network is in a sleep mode in which the IoT device is unable to send or receive network communications, in response to determining that the IoT device is in the sleep mode, storing network communications addressed to the IoT device and received at the proxy device from a remote server outside the home network on behalf of the IoT device until determining that the IoT device has entered an active mode in which the IoT device is able to send and receive network communications, and sending the stored network communications to the IoT device in response to determining that the IoT device has entered active mode.

The method may further include sending keep-alive messages to the remote server while the IoT device is in sleep mode.

The method may further include determining whether the IoT device is in sleep mode based on a sleep mode schedule provided by the IoT device to the proxy device.

The method may further include determining whether the IoT device is in sleep mode in response to detecting signaling from the IoT device over a low power radio protocol.

The method may further include determining that the IoT device is no longer in sleep mode in response to receiving an explicit control message from the IoT device.

The method may further include determining that the IoT device is no longer in sleep mode in response to receiving a network communication from the IoT device.

The method may further include implementing transmission control protocol, TCP, and lower level protocols at the proxy device, and passing higher level protocol communications through the proxy device to the IoT device without change.

A proxy device according to further embodiments includes a processor circuit, a memory coupled to the processor circuit, a proxy module in the memory for determining that the IoT device is in a sleep mode in which the IoT device is unable to send or receive network communications, a buffering module in the memory for storing network communications received from a remote server on behalf of the IoT device until determining that the IoT device has entered an active mode in which the IoT device is able to send and receive network communications in response to determining that the IoT device is in the sleep mode, and a sending module for sending the stored network communications to the IoT device in response to determining that the IoT device has entered active mode.

DETAILED DESCRIPTION

Figure 1:
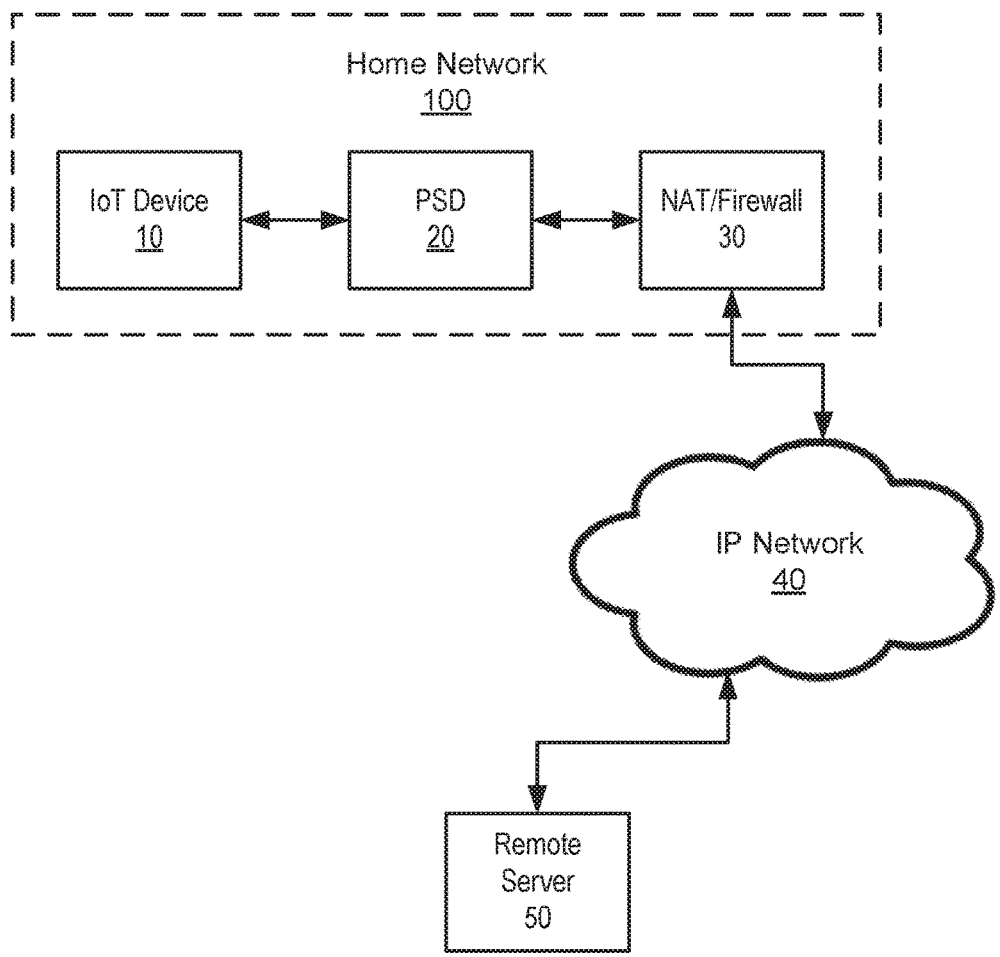
FIG. 1 is a simplified schematic block diagram illustrating a network environment in which a proxy device in accordance with some embodiments can be employed.

As described above, Internet of Things (IoT) devices are typically not directly addressable from outside a network, such as a local area network (LAN) in which the devices operate due to the presence of a NAT/Firewall that controls access to the network. To resolve this problem, one possible solution is to maintain a long lived TCP connection through the NAT/Firewall. By regularly sending "keep-alive" messages from the device, the connection through the NAT/Firewall may be kept open. This approach is used, for example, by Google Cloud Messaging and W3C Push. However, the use of long-lived connections is less feasible to implement on resource-constrained devices, such as IoT devices. Resource-constrained devices typically have low amounts of available memory, limited CPU capabilities and limited power resources. For example, many remote sensors in the IoT are operated on battery power alone. Such devices may be expected to run for several years without re-charging or replacing the battery. To achieve a long battery lifetime, such devices may be designed to have long deep sleep cycles during which power consumption is kept to an absolute minimum. IoT devices with long sleep cycles are referred to herein as "sleepy" IoT devices. In general, a "sleepy" IoT device has is one that has a sleep cycle that is longer than a period in which the device would have to send a keep-alive message to a remove server in order to maintain an active TCP connection with the remote server. When the device becomes active (i.e., "wakes up"), it is important to keep the time the device is in an active mode as short as possible to reduce power consumption.

However, using long-lived connections for IoT devices has a number of drawbacks. For example, the "keep-alive" messages and the sending of packets to the IoT device must be synchronized with the wake-up cycles of the IoT device. Moreover, sending keep-alive messages consumes power, and the IoT device has to be active to send the message even if the device does not have any payload data to send or receive.

If the IoT device is in sleep mode, it is not possible to deliver packets to the IoT device. If one or several packets are lost, congestion control will be triggered at the TCP layer. That will cause the server to automatically throttle the data traffic from the server to the IoT device, which may cause the device to remain in an active mode for a longer period of time when it does wake up.

In addition, round-trip transmission times that are experienced when contacting a cloud server may be long compared to the time needed to access a resource in the device's home network. Long round trip times may cause an IoT device to remain in active mode longer than desired, resulting in undesirable power consumption by the IoT device.

The problems described above can occur for a sleepy IoT device that employs a normal request/response paradigm. For example, during a Transport Layer Security (TLS) handshake, several kilobytes of data may be transferred. When the sleep cycle of an IoT device is tuned for transmitting/receiving small amounts of data, if it takes a very long time to send responses to the IoT device, a TCP retransmission may be triggered, since the IoT device may be offline when the response is transmitted. In that case, data may actually be sent several times to the IoT device and the duplicates will be removed with TCP duplicate removal. In addition, TCP congestion control may be triggered due to re-transmission, which will throttle the data traffic.

Some embodiments of the inventive concepts provide an architecture that addresses the problem of communicating with sleepy IoT devices over TCP/IP communication networks. In particular, some embodiments provide a proxy server in a home network that manages TCP/IP communications links for sleepy IoT devices. With the presence of a proxy server configured as described herein, the cloud server can run standard profiles for TLS/TCP connections to sleepy IoT devices without any modification. The architecture described herein also provides end-to-end transport layer security which is different from solutions that use a COAP/DTLS to HTTP/TLS protocol converter. The functionality described herein are realized as a result of the close relation between the IoT device and the proxy server. Moreover, the IoT device can delegate tasks to the proxy that keep track of the sleep cycles/status of the IoT device.

Some embodiments provide a network element referred to herein as a Proxy for Sleepy Devices (PSD). The PSD acts as node between an IoT device and a remote server. The PSD handles two TCP connections: one from the IoT device to the PSD, one from the PSD to the remote server. The PSD relays packets between the connections. Since all packets are relayed, all protocols above TCP remain untouched by the PSD. For example, end-to-end transport security with TLS can be provided between the IoT device and remote server.

FIG. 1 illustrates a PSD 20 that is provided in a home network 100. The home network 100 may, for example, be a corporate LAN, a sensor network, a home network, or any other communication network that includes an IoT device 10. The home network 100 also includes a network address translation (NAT)/firewall function 30 that controls the flow of packets into and out of the home network 100. The NAT/firewall function 30 may be implemented, for example, in a gateway that connects the home network 100 to an external network, such as the IP network 40 which may, for example, be the Internet. NAT/firewall functions are well known in the art.

The IoT device 10 communicates through the home network 100 and the external network 40 with a remote server 50. The remote server 50 may be referred to as a "cloud server." However, it will be appreciated that the remote server can be any device that communicates with the IoT device 10. In many IoT applications, the remote server 50 collects data from multiple IoT devices through the IP network 40. For example, data collected by the remote server 50 may include sensor data that is processed, stored, forwarded or otherwise handled by the remote server 50.

The PSD 20 is provided between the IP network 40 and the IoT device 10, and in particular sits between the IoT device 10 and the NAT/firewall function 30 of the home network 40. From this location, the PSD 20 manages all incoming and outgoing communications of the IoT device 10. As will be described in more detail below. The IoT device 10 may be a "sleepy" device, in that the IoT device 10 may try to remain in a low power or sleep mode for as much of the time as possible. For that reason, the IoT device 10 may seek to limit the sending and receiving of data to small windows of activity when the IoT device 10 is "awake."

During the time that the IoT device 10 is awake, it may maintain an active packet data protocol (PDP) context with the remote server 50. According to various embodiments, when the IoT device is "asleep" or in low power mode, the PDP context of the IoT device 10 may be maintained on its behalf by the PSD 20. Thus, from the standpoint of the remote server 50, it may appear that the IoT device 10 is awake and responding, even when the IoT device 10 is in sleep mode.

To avoid having packets that are sent from the server be discarded when the IoT device 10 is in sleep mode, the PSD 20 may be configured to buffer packets received from the remote server 50 until the IoT device 10 becomes active again. This will avoid packet loss while the IoT device 10 is in sleep mode. In addition, since the PSD 20 can send an acknowledgement of packets to the remote server 50 once the packet has been buffered, retransmission and congestion control may not be triggered at the remote server 50.

When the IoT device 10 becomes active, the PSD 20 may be configured to send all previously queued packets to the IoT device 10. Since the PSD 20 is located in the home network 100 of the IoT device 10, the buffered packets can be delivered with low latency, and the IoT device 10 can return more quickly to lower power mode compared to the situation in which the IoT device 10 must wait for packets from the remote server 50.

Figure 2:
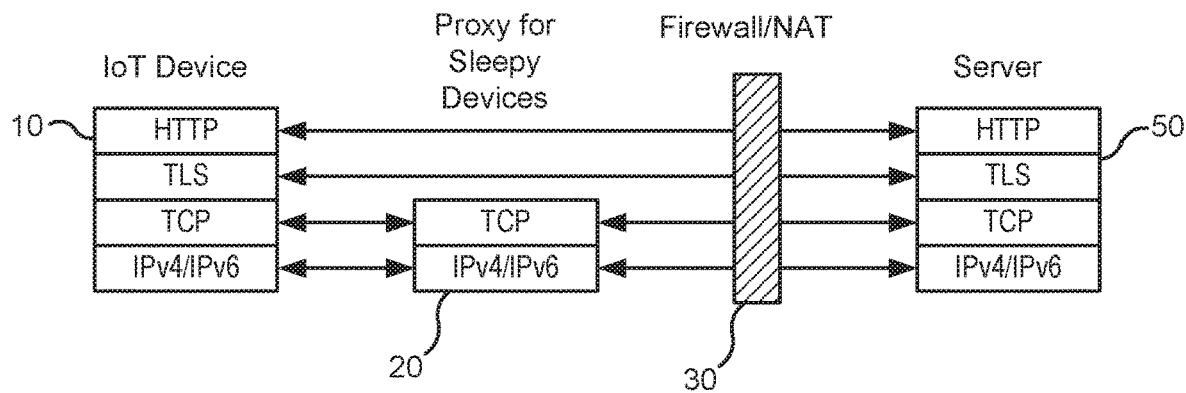
FIG. 2 is a simplified schematic block diagram illustrating the placement of a proxy device in accordance with some embodiments in a network.

FIG. 2 illustrates the logical relationship between the IoT device 10, the PSD 20, the NAT/firewall function 30 and the remote server 50 in terms of the protocols that are implemented by each device. The layers illustrated in FIG. 2 roughly correspond to layers in the Open Systems Interconnection (OSI) model of computer communications. The OSI model is well known model that divides responsibility for communication tasks into layers, including (from bottom to top), the physical layer, data link layer, network layer, transport layer, session layer, application layer and presentation layer.

As can be seen in FIG. 2, the PSD 20 only implements the TCP, IP and lower protocols, which correspond to the transport, network and physical layers of the OSI model. The PSD 20 does not interact with layers above the transport layer, which is where the transaction layer security (TLS) protocol and the hypertext transport protocol (HTTP) are implemented. Thus, HTTP and TLS flows pass through the PSD 20 from the IoT device 10 to the remote server 50, and are unaffected by the PSD 20. In this manner, the system may maintain end-to-end transaction layer security for the connection between the IoT device 10 and the remote server 50. Meanwhile, the PSD 20 maintains a TCP connection (along with the related PDP context) between the IoT device 10 and the remote server 50, even when the IoT device 10 is in sleep mode through the use of keep-alive messages and acknowledgements (ACKs) sent by the PSD 20 to the remote server 50 on behalf of the IoT device 10.

In some embodiments, the PSD 20 may have a mechanism that allows the PSD 20 to detect when the IoT device 10 is active. Such functionality can be implemented in a number of ways. For example, in some embodiments, the IoT device 10 and the PSD 20 may synchronize their clocks using a time synchronization protocol. If the IoT device 10 discloses its sleep cycle to the PSD 20, the PSD 20 can send packets to the IoT device 10 only when the IoT device 10 is active. In some embodiments, the PSD 20 may be configured to detect that the IoT device 10 is active by detecting signaling from the device using a low power radio protocol. For example, the PSD 20 may be configured to detect if the IoT device 10 is transmitting using a Bluetooth or Zigbee transmitter.

In some embodiments, the PSD 20 can learn the periodicity of transitions of the IoT device 10 from active to inactive states by monitoring signaling from the IoT device 10.

In other embodiments, the PSD 20 may detect when there is traffic generated from the IoT device 10 to the network, either by receiving an explicit control message from the IoT device 10 or any other type of network traffic. The reception at the PSD 20 of IP traffic from the IoT device 10 may trigger the PSD 20 to flush all packets that are buffered for the IoT device 10.

As noted above, long-lived TCP connections may be used to maintain a TCP connection through a NAT/firewall. By locating the PSD 20 behind the last NAT or firewall that protects the IoT device 10, it is sufficient to send keep-alive messages from the PSD 20 to the remote server. Hence, the IoT device 10 does not need to wake-up when it is time to send a new keep-alive message. The PSD 20 will maintain the long-lived connections.

The PSD 20 may be particularly advantageous in a system with IoT device 10s with limited resources where Transport Layer Security is provided from end-to-end between the IoT device 10 and a remote server located outside the home network of the IoT device 10, such as in the cloud.

According to various embodiments, the PSD 20 may be configured to buffer packets when the IoT device 10 is in sleep mode and send an acknowledgement (ACK) back to the remote server so that TCP re-transmission/congestion control is not initiated by the remote server.

Figure 3:
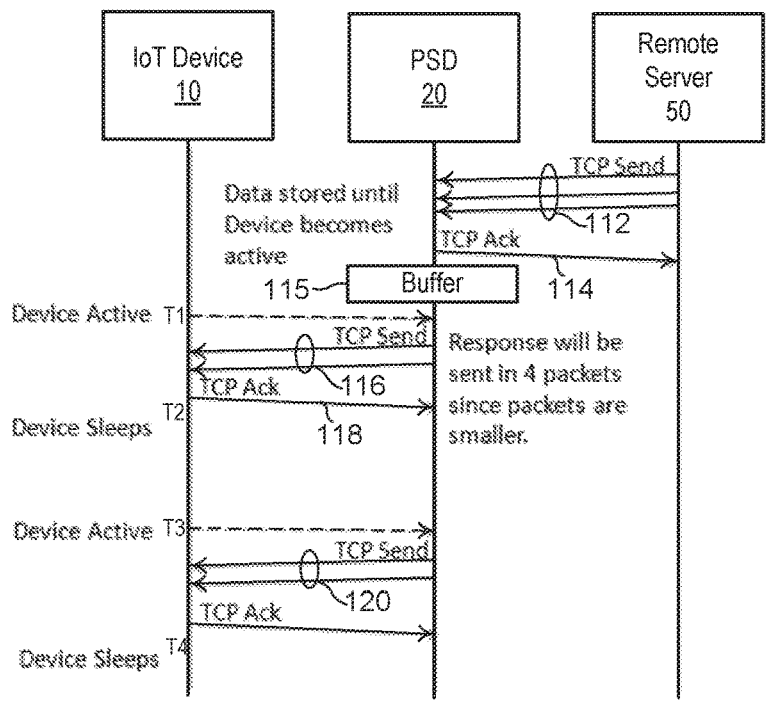
FIGS. 3, 4 and 5 are flow diagrams that illustrate communications with a proxy device in accordance with some embodiments.

For example, FIG. 3 is a flow diagram illustrating various message flows between an IoT device 10, a PSD 20 and a remote server 50. Referring to FIG. 3, the remote server 50 may send numerous packets 112 to the IoT device 10 by means of TCP Send messages. The PSD 20 acknowledges the packets with a TCP Ack message 114 and then determines whether or not the IoT device 10 is currently active or sleeping. In this example, the PSD 20 determines that the IoT device is currently sleeping, so the PSD 20 buffers the packets (block 115) in memory until the IoT device 10 becomes active at time T1. Once the IoT device 10 has become active, the PSD 20 begins sending the buffered packets to the IoT device 10. In this example, the packet size for packets sent in the home network is smaller than the packet size of packets received from the remote server 50, so the PSD 20 may re-package the packets into a larger number of smaller packets.

In this example, the PSD 20 buffered three packets from the remote server 50, and re-packages the packets into four packets for sending to the IoT device 10. In this example, the PSD 20 sends two packets 116 to the IoT device 10 via TCP Send messages. The two packets are acknowledged by the IoT device 10 via a TCP ACK message 118, after which the IoT device 10 returns to sleep mode at time T2.

The PSD 10 then waits until the IoT device 10 again becomes active at time T3 before sending the remaining two packets 120 via TCP Send messages. The IoT device 10 acknowledges the packets and returns to sleep mode at time T4.

The PSD 20 may detect when the IoT device 10 becomes active at time T3 and deliver buffered packets to the IoT device 10 at that time. Furthermore, the PSD 20 may send keep-alive messages to the remote server to keep the connection on behalf of the IoT device 10 through any firewall/NAT without waking the IoT device 10.

Figure 4:
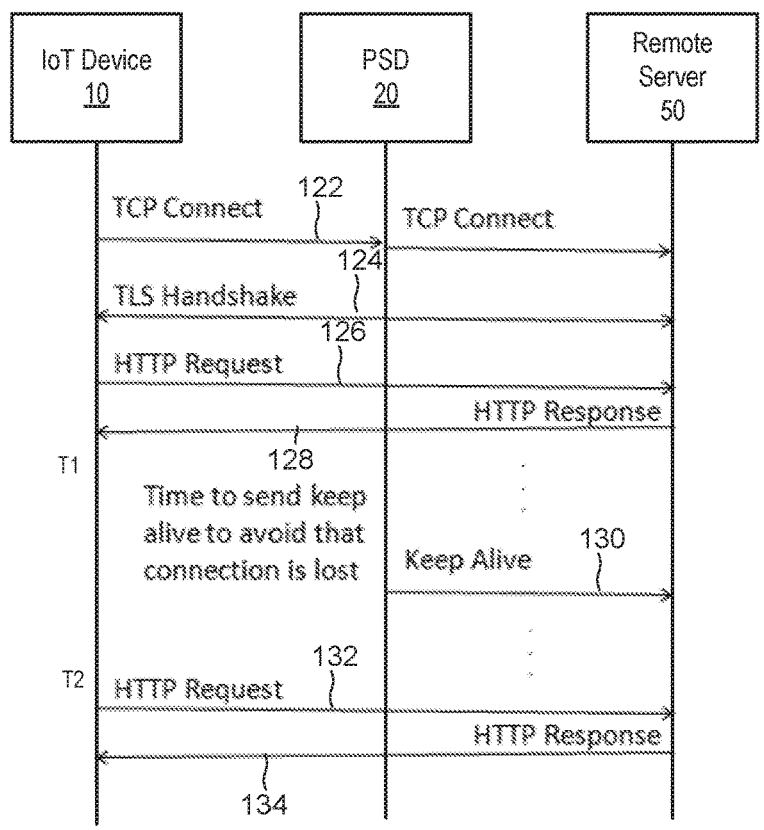

FIG. 4 is a flow diagram illustrating the use of keep-alive messages to maintain a TCP connection between an IoT device 10 and a remote server 50. While awake, the IoT device 10 sends a TCP Connect message 122 to the remote server 50. (It will be appreciated that all messages sent/received between the IoT device 10 and the remote server 50 are first received by the PSD 20 and forwarded on to the remote server 50 or the IoT device 10 as illustrated for the TCP Connect message 122, even messages that are shown in FIG. 4 as a single message passing through the PSD 20.)

The remote server 50 and the IoT device 10 then perform a TLS Handshake exchange 124 to establish end-to-end transaction layer security between the nodes. While still in active mode, the IoT device 10 sends an HTTP request 126 to the remote server 50, which responds with an HTTP response 128. After receiving the HTTP Response 128, at time T1, the IoT device 10 enters sleep mode. The IoT device 10 may inform the PSD 20 that it is entering sleep mode, or the PSD 20 may know that the IoT device is in sleep mode, for example, based on a predetermined schedule. The IoT device 10 may remain in sleep mode until a later time T2. During the period between T1 and T2, the PSD 20 may send periodic "keep-alive" messages 130 to the server 50 to keep the TCP connection between the server 50 and the IoT device 10 alive.

After time T2, the IoT device 10 wakes up. Because the TCP connection between the IoT device 10 and the remote server 50 has been maintained by the PSD 20 while the IoT device was in sleep mode, the IoT device may immediately send an HTTP request 132 to the remote server 50 without having to re-establish a TLS session with the remote server 50 via a TCP connect message and a TLS handshake. The remote server 50 can also respond with an HTTP response 134.

Figure 5:
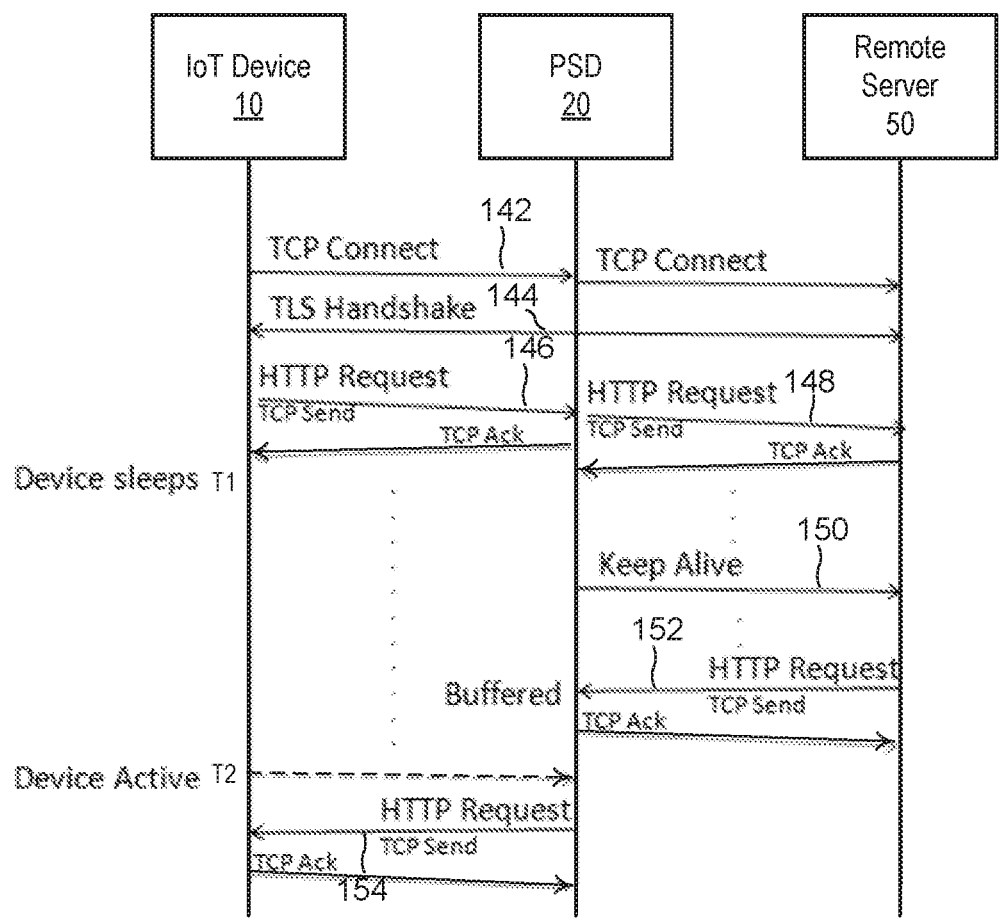

FIG. 5 illustrates the use of buffering by the PSD 20 while a TCP connection is being maintained with keep-alive messages. In the example illustrated in FIG. 5, an IoT device 10 initiates a TCP connection with a remote server 50 by means of a TCP Connect message 142. Once the TCP connection has been initialized, the remote server may establish transaction layer security by initiating a TLS handshake 144 with the IoT device 10. The IoT device 10 may then send an HTTP request 146 to the remote server 50 via the PSD 20. The PSD 20 receives the HTTP request 146 and in response sends and acknowledgement of the request to the IoT device 10. The IoT device can then enter sleep mode at time T1 without having to wait for an acknowledgement from the remote server. Meanwhile, the PSD 20 forwards the HTTP request to the remote server 50 as HTTP request 148. The HTTP request 148 may be acknowledged by the remote server 50 after the IoT device has entered sleep mode. While the IoT device 10 is in sleep mode, the PSD 20 may send one or more "keep alive" messages to the remote server 50 to maintain the TCP connection on behalf of the IoT device 10.

While the IoT device is in sleep mode, the PSD 20 may receive, buffer and acknowledge HTTP requests and responses 152 sent by the remote server 50 to the IoT device 10. Once the PSD has detected that the IoT device 10 is active again at time T2, the PSD 20 can forward the buffered HTTP request/response 152 to the IoT device 10 as an HTTP request/response 154.

Although buffering packets and sending acknowledgments are common activities in packet-switched communication systems, such as in IETF CoAP <-> HTTP Proxy, such systems may not provide end-to-end security between a server and an IoT device. Moreover, IETF HTTP provides no support for sleepy devices.

In addition, while loosely synchronized networks (such as 3GPP) may detect when a device is active and send packets only when an active PDP context is present, such systems may not support end-to-end TLS/TCP connections. In contrast, the use of a PSD 20 to maintain an HTTP/TLS connection on behalf of an IoT device 10 as described herein may scale well to large numbers of users while maintaining end-to-end transport layer security.

Figure 6:
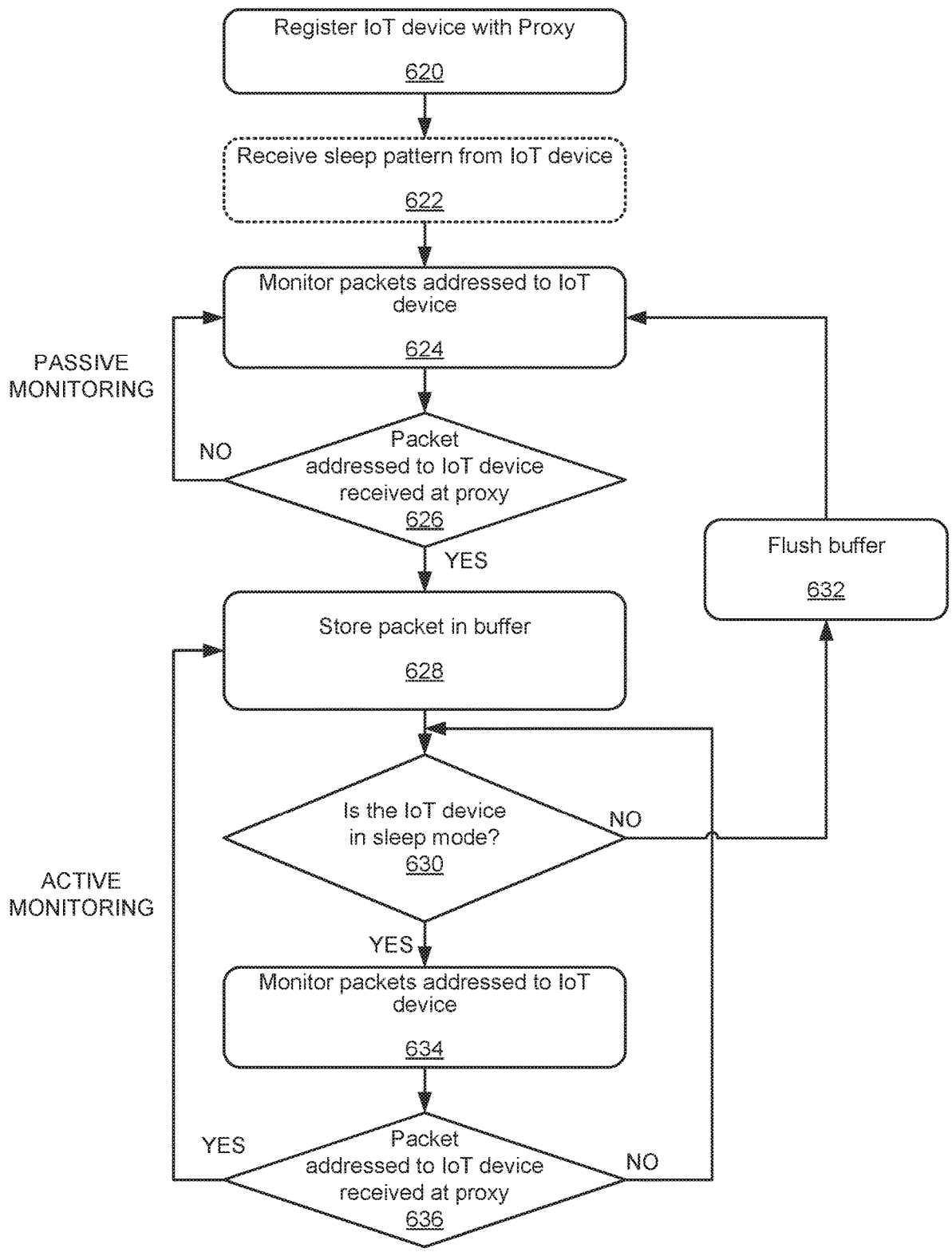
FIGS. 6, 7A and 7B are flowcharts illustrating operations of a proxy device in accordance with some embodiments.

Operations of a PSD 20 according to various embodiments are illustrated in FIG. 6. Referring to FIGS. 1 and 6, when an IoT device 10 is added to a home network 100, the IoT device 10 may register itself with the PSD 20 (block 620). As part of the registration process, the IoT device 10 may optionally provide the PSD 20 with a sleep pattern or sleep schedule that informs the PSD 20 of when the IoT device will be asleep and when it will be awake (block 622). The IoT device 10 and the PSD 20 may also optionally exchange timestamps for synchronization.

The PSD 20 then enters a passive monitoring mode in which the PSD 20 monitors network communications to/from the IoT device 10 (block 624), but does not have any stored packets in the packet buffer. At block 626, the PSD 20 determines if a packet addressed to the IoT device 10 has been received from an external server. If not, the PSD continues to monitor communications at block 624.

If the PSD 20 receives a packet addressed to the IoT device 10 at block 626, the PSD 20 stores the packet in a packet buffer (block 628).

The PSD 20 then determines whether the IoT device 10 is currently in sleep mode (block 630). This determination may be made on the basis of the sleep pattern provided by the IoT device 10, by sending a test packet to the IoT device 10, or by any other suitable method.

If it is determined at block 630 that the IoT device 10 is not currently in sleep mode, the PSD 20 flushes the packet buffer, which causes the packet to be send to the IoT device 10 through the home network 100.

However, if it is determined that the IoT device 10 is in sleep mode, the PSD 20 keeps the stored packet in the packet buffer and enters an active monitoring mode in which the PSD 20 continues to monitor the network for packets addressed to the IoT device (block 634) while storing packets in the packet buffer. In the active monitoring mode, the PSD 20 determines at block 636 if a packet addressed to the IoT device is received at the PSD 20. If so, the PSD 20 stores the packet in the packet buffer (block 628) and again checks at block 630 to see if the IoT device 10 is still in sleep mode. If no packet is received at block 636, the PSD 20 again checks to see if the IoT device 10 is in sleep mode, and if so, stays in the active monitoring mode.

Figure 7A:
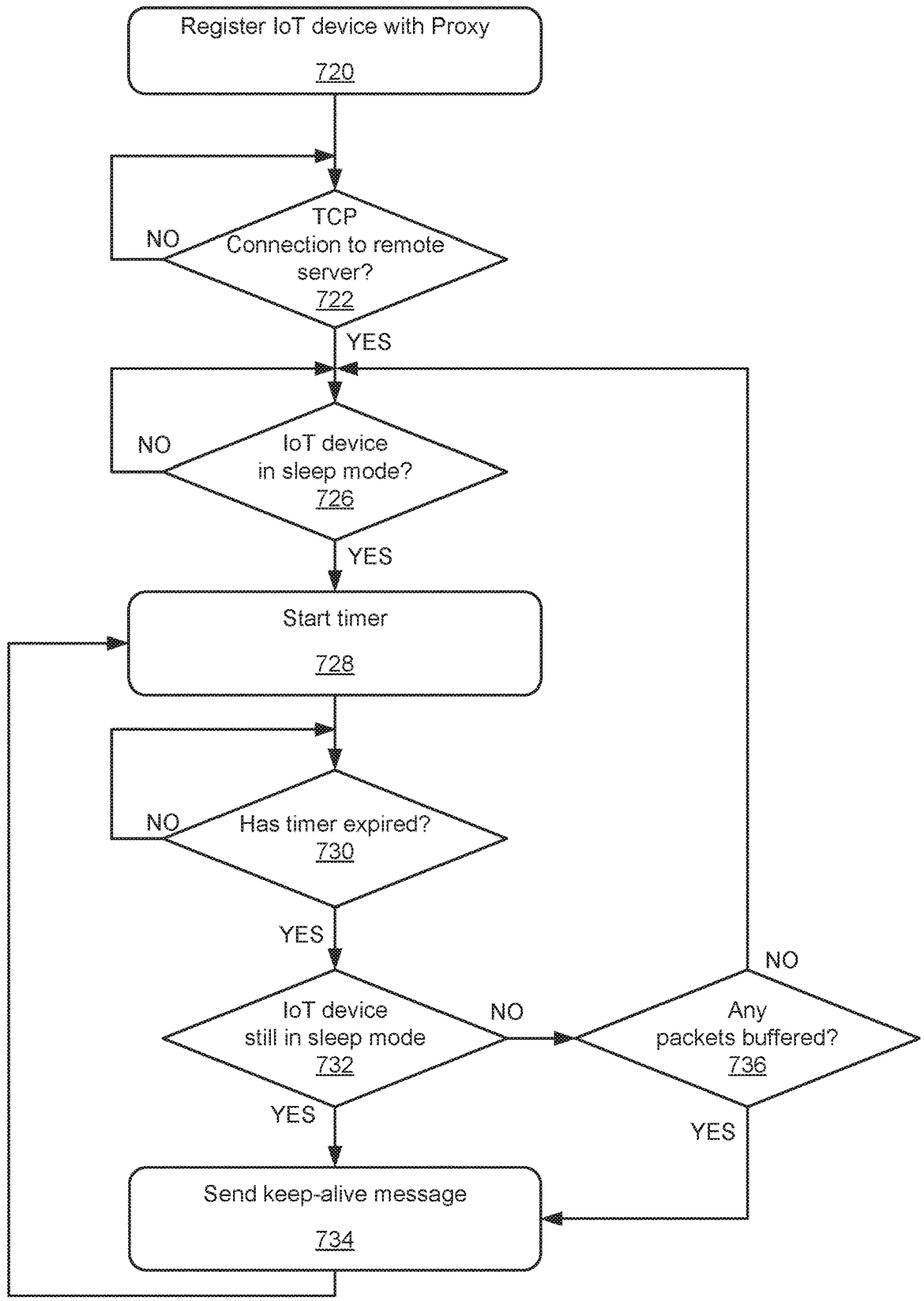

FIG. 7A is a block diagram of further operations that may be performed by a PSD 20. The operations illustrated in FIGS. 6 and 7A may be performed simultaneously with, consecutively with, or exclusive of each other.

Referring to FIGS. 1 and 7A, when an IoT device 10 is added to a home network 100, the IoT device 10 may register itself with the PSD 20 (block 720). As part of the registration process, the IoT device 10 may optionally provide the PSD 20 with a sleep pattern or sleep schedule that informs the PSD 20 of when the IoT device will be asleep and when it will be awake. The IoT device 10 and the PSD 20 may also optionally exchange timestamps for synchronization.

The PSD 20 waits at block 722 until the IoT device 10 has established a TCP connection with a remote server.

The PSD 20 then determines at block 726 if the IoT device 10 is in sleep mode. If not, the PSD 20 may continue to monitor the IoT device 10 until it determines that the IoT device 10 is in sleep mode. Once the IoT device has entered sleep mode, the PSD 20 starts a timer at block 728, and monitors whether the timer has expired at block 730. The timer may be set to a value that is less than a timeout period set for TCP connections with the IoT device. That is, the timer value may be based on an expected shortest possible time interval after which network NATs/firewalls will close a TCP connection after a message has passed through it.

Once the timer expires, the PSD 20 determines if the IoT device is still in sleep mode at block 732, and if so, sends a keep-alive message to the remote server with which the IoT device 10 has a TCP connection (block 734). Operations then proceed to block 728, where the PSD 20 again starts the timer. If the IoT device is not in sleep mode, the PSDD 20 checks to see if it has buffered any packets for the IoT device 10 (block 736), and if so, sends the keep alive message on behalf of the IoT device 10 so that the TCP connection will not time out while the IoT device processes the buffered packets. If no packets are buffered, operations return to block 726.

Figure 7B:
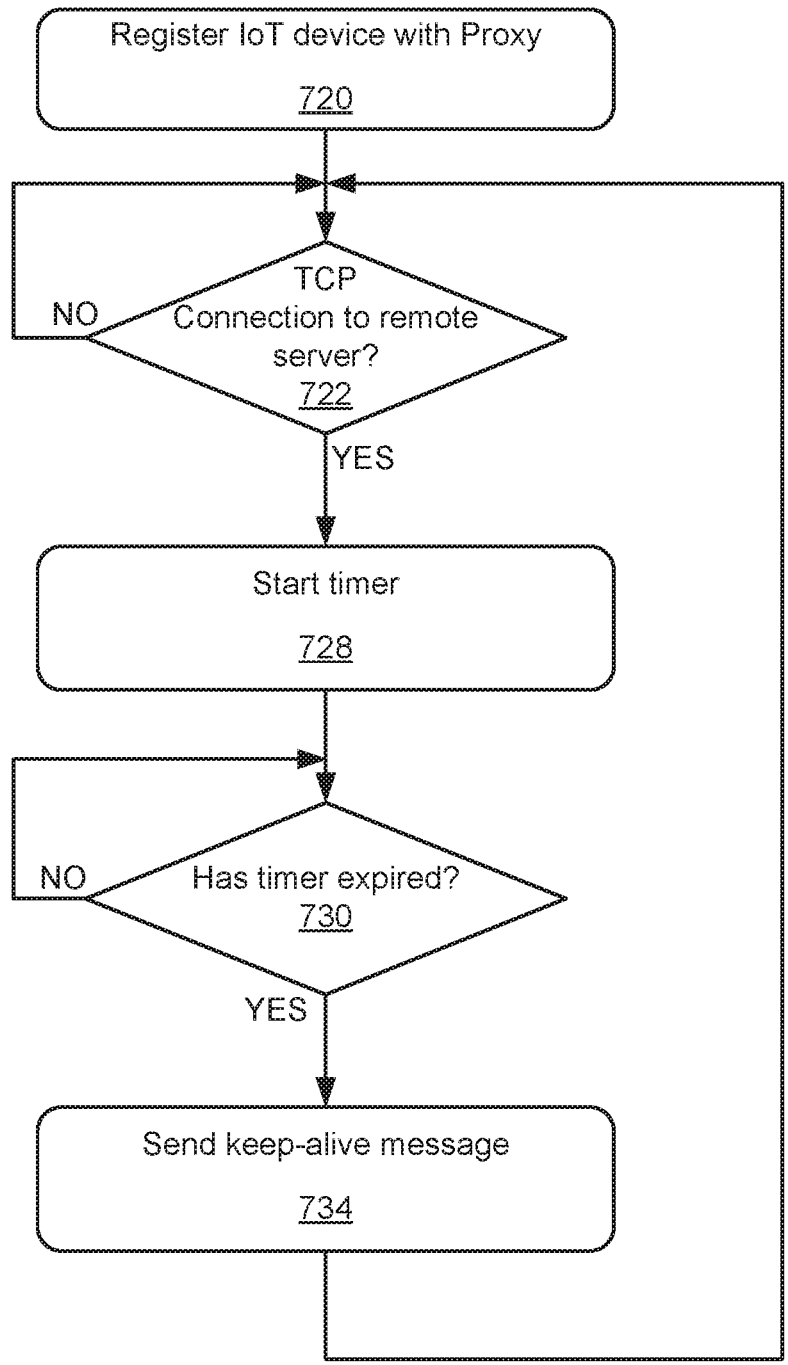

FIG. 7B illustrates an alternative approach in which the PSD 20 does not check to see if the IoT device 10 is in sleep mode, but simply waits for the IoT device 10 to establish a TCP connection to a remote server (block 722), and then starts the timer (block 728), waits for the timer to expire (block 730) and then sends a keep-alive message to the remote server (block 734).

Figure 8:
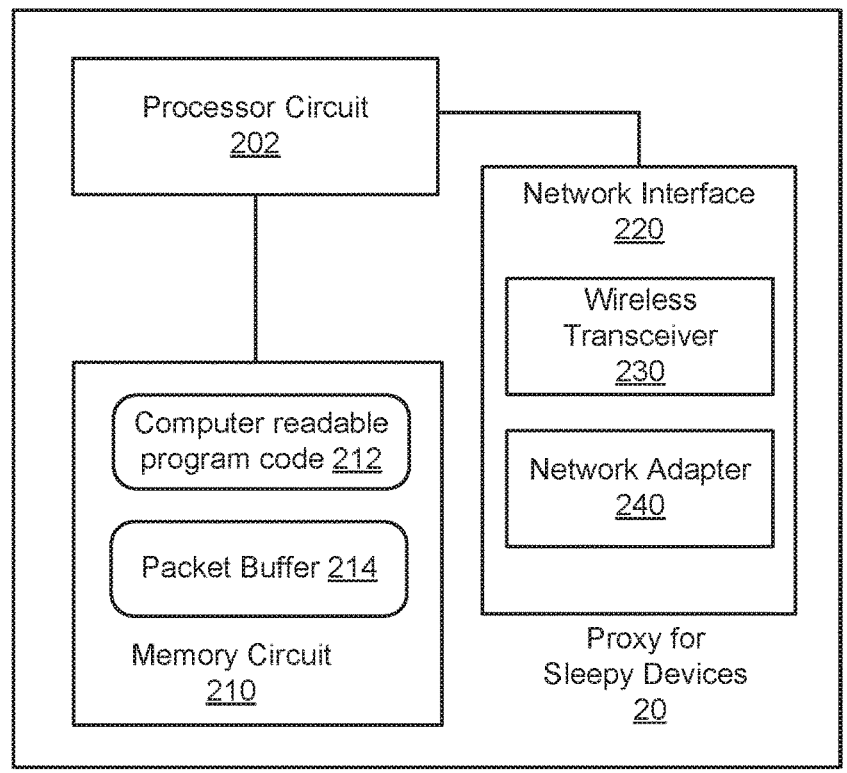
FIG. 8 is a simplified schematic block diagram of a proxy device in accordance with some embodiments.

FIG. 8 is a schematic block diagram of a PSD 20 that is configured to perform operations according to one or more embodiments disclosed herein. The PSD 20 includes a transceiver 220, a processor circuit 202, and a memory circuit 210 containing computer readable program code 212.

The transceiver 220 is configured to communicate with a network node, the example of which is an IoT 10, through a wireless air interface. The processor circuit 202 may include one or more data processing circuits, such as a general purpose and/or special purpose processor, e.g., microprocessor and/or digital signal processor. The processor circuit 202 is configured to execute the computer readable program code 212 in the memory circuit 210 to perform at least some of the operations described herein as being performed by a PSD.

Figure 9:
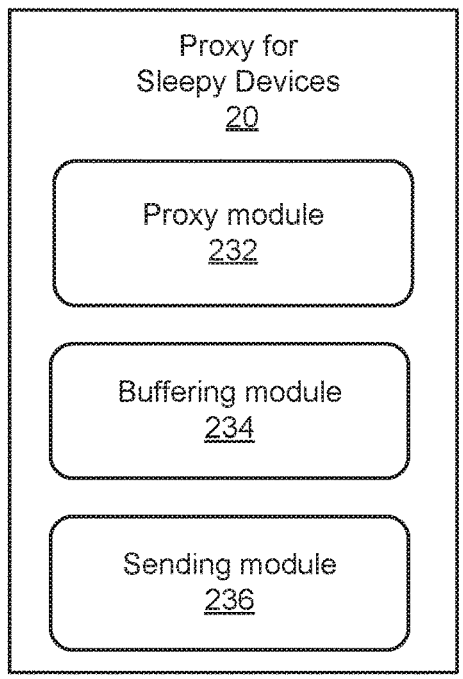
FIG. 9 is a simplified schematic block diagram that illustrates functional modules in a proxy device in accordance with some embodiments.

FIG. 9 is a functional block diagram of a PSD 20 in accordance with some embodiments. In particular, the PSD 20 includes a proxy module 232 for monitoring (624) packets sent to/from an IoT device 10 and determining (630) whether the IoT device 10 is in sleep mode. The PSD 20 may include a buffering module 234 for storing (628) packets addressed to the IoT device, and a sending module 236 for sending (632) buffered packets to the IoT device 10 when the IoT device 10 is no longer in sleep mode.

Further Definitions and Embodiments

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A proxy device, comprising:
    a processor circuit;
    a memory coupled to the processor circuit; and
    a network interface coupled to the processor circuit;
    wherein the processor circuit is configured to function as a proxy for network communications to and from an internet of things, IoT, device that is located within a same home network as the proxy device;
    wherein the processor circuit is configured to determine that the IoT device is in sleep mode in which the IoT device is unable to send or receive network communications;
    wherein the processor circuit is configured, in response to determining that the IoT device is in sleep mode, to store network communications received from a remote server on behalf of the IoT device until determining that the IoT device has entered active mode in which the IoT device is able to send and receive network communications;
    wherein the processor circuit is configured to send the stored network communications to the IoT device in response to determining that the IoT device has switched to the active mode from sleep mode; and
    wherein the processor circuit is configured to determine whether the IoT device is in the sleep mode based on a periodicity of transitions of the IoT device from the active mode to the sleep mode learned by monitoring signaling from the IoT device.

2. The proxy device of claim 1, wherein the processor circuit is configured to send keep-alive messages to the remote server based on determining that the IoT device is in sleep mode.

3. The proxy device of claim 1, wherein the processor circuit is configured to determine whether the IoT device is in sleep mode based on a sleep mode schedule provided by the IoT device to the proxy device.

4. The proxy device of claim 1, wherein the processor circuit is configured to determine whether the IoT device is in sleep mode in response to detecting signaling from the IoT device over a low power radio protocol.

5. The proxy device of claim 1, wherein the processor circuit is configured to determine that the IoT device is no longer in sleep mode in response to receiving an explicit control message from the IoT device.

6. The proxy device of claim 1, wherein the processor circuit is configured to determine that the IoT device is no longer in sleep mode in response to receiving a network communication from the IoT device.

7. The proxy device of claim 1, wherein the processor circuit is configured to implement transmission control protocol, TCP, and lower level protocols, and to pass higher level protocol communications through to the IoT device without change.

8. The proxy device of claim 7, wherein the higher level protocol communications include transport layer security, TLS, protocols.

9. The proxy device of claim 7, wherein the higher level protocol communications include hypertext transport protocol, HTTP, protocols.

10. A method, comprising:
    determining, at a proxy device coupled to a home network, that an Internet of Things, IoT, device in the home network is in a sleep mode in which the IoT device is unable to send or receive network communications based on a periodicity of transitions of the IoT device from active mode to the sleep mode learned by monitoring signaling from the IoT device;
    in response to determining that the IoT device is in the sleep mode, storing network communications addressed to the IoT device and received at the proxy device from a remote server outside the home network on behalf of the IoT device until determining that the IoT device has entered the active mode in which the IoT device is able to send and receive network communications; and
    sending the stored network communications to the IoT device in response to determining that the IoT device has entered the active mode.

11. The method of claim 10, further comprising sending keep-alive messages to the remote server while the IoT device is in sleep mode.

12. The method of claim 10, further comprising determining whether the IoT device is in sleep mode based on a sleep mode schedule provided by the IoT device to the proxy device.

13. The method of claim 10, further comprising determining whether the IoT device is in sleep mode in response to detecting signaling from the IoT device over a low power radio protocol.

14. The method of claim 10, further comprising determining that the IoT device is no longer in sleep mode in response to receiving an explicit control message from the IoT device.

15. The method of claim 10, further comprising determining that the IoT device is no longer in sleep mode in response to receiving a network communication from the IoT device.

16. The method of claim 10, further comprising implementing transmission control protocol, TCP, and lower level protocols at the proxy device, and passing higher level protocol communications through the proxy device to the IoT device without change.

17. The method of claim 16, wherein the higher level protocol communications include transport layer security, TLS, protocols.

18. The method of claim 16, wherein the higher level protocol communications include hypertext transport protocol, HTTP, protocols.

19. A proxy device, comprising:
- a processor circuit;
- a memory coupled to the processor circuit;
- a proxy module in the memory for determining that the IoT device is in a sleep mode in which the IoT device is unable to send or receive network communications;
- a buffering module in the memory for storing network communications received from a remote server on behalf of the IoT device until determining that the IoT device has entered an active mode in which the IoT device is able to send and receive network communications in response to determining that the IoT device is in the sleep mode; and
- a sending module for sending the stored network communications to the IoT device in response to determining that the IoT device has entered the active mode
- wherein the proxy module is configured to determine whether the IoT device is in the sleep mode based on a periodicity of transitions of the IoT device from the active mode to the sleep mode learned by monitoring signaling from the IoT device.

* * * * *